US009768572B1

(12) United States Patent
Gelineau et al.

(10) Patent No.: US 9,768,572 B1
(45) Date of Patent: Sep. 19, 2017

(54) QUICK-CONNECTOR CONVERSION SYSTEM FOR SAFETY CONTROLLER

(71) Applicant: Banner Engineering Corp., Plymouth, MN (US)

(72) Inventors: Matthew Michael Gelineau, Blaine, MN (US); Calvin James Sargent, Bloomington, MN (US)

(73) Assignee: Banner Engineering Corp., Plymouth, MN (US)

( * ) Notice: Subject to any disclaimer, the term of this patent is extended or adjusted under 35 U.S.C. 154(b) by 0 days.

(21) Appl. No.: 15/143,221

(22) Filed: Apr. 29, 2016

(51) Int. Cl.
*D06F 39/02* (2006.01)
*H01R 33/945* (2006.01)
*H01R 13/641* (2006.01)
*H01R 13/717* (2006.01)

(52) U.S. Cl.
CPC ......... *H01R 33/945* (2013.01); *H01R 13/641* (2013.01); *H01R 13/717* (2013.01)

(58) Field of Classification Search
CPC ........ D06F 39/02; D06F 39/022; H03M 1/00; H03M 2201/4135; H01R 13/6658
USPC .......................................... 68/17 R; 341/139
See application file for complete search history.

(56) References Cited

U.S. PATENT DOCUMENTS

| | | | |
|---|---|---|---|
| 2,828,352 A | 3/1958 | Shewmon | |
| 3,953,933 A | 5/1976 | Goldstein | |
| 4,327,396 A * | 4/1982 | Schacht | H02B 1/305 361/648 |
| 4,829,779 A | 5/1989 | Munson et al. | |
| 4,850,884 A | 7/1989 | Sawai et al. | |
| 4,981,024 A * | 1/1991 | Beldham | D06F 39/022 194/243 |
| 5,001,358 A | 3/1991 | Matsuoka et al. | |
| 5,602,363 A | 2/1997 | Von Arx | |
| 5,713,766 A | 2/1998 | Davies et al. | |
| 5,781,744 A | 7/1998 | Johnson et al. | |
| 6,347,963 B1 | 2/2002 | Falkenberg et al. | |
| 6,631,476 B1 | 10/2003 | Vandesteeg et al. | |
| 6,650,026 B2 | 11/2003 | Arai et al. | |
| 6,744,147 B2 | 6/2004 | Taniguchi et al. | |
| 7,094,113 B1 | 8/2006 | Hasenour et al. | |
| 7,116,069 B1 | 10/2006 | Holterman et al. | |
| 7,242,116 B2 | 7/2007 | Kawazu et al. | |
| 7,610,119 B2 | 10/2009 | Abe et al. | |
| 7,813,813 B2 | 10/2010 | Muneta et al. | |
| 8,055,814 B2 | 11/2011 | Sichner et al. | |

(Continued)

*Primary Examiner* — Hien Vu
(74) *Attorney, Agent, or Firm* — Craige Thompson; Thompson Patent Law

(57) ABSTRACT

Apparatus and associated methods relate to a quick-connector conversion system having a front cover and a rear module. In an illustrative example, the front cover includes apertures from which a plurality of connector ports extend through. Each connector port of the plurality of connector ports is in electrical communication with a first communication module. A rear module includes a second communication module electrically connected to a plurality of input/output (I/O) terminals such that when the front cover aligns with the rear module, the first communication module pluggably connects to the second communication module. When the first communication module and the second communication module are pluggably connected, the plurality of connector ports electrically connects to the plurality of the I/O terminals.

16 Claims, 15 Drawing Sheets

(56) References Cited

U.S. PATENT DOCUMENTS

| | | |
|---|---|---|
| 8,128,435 B2 | 3/2012 | Trinh |
| 8,184,417 B2 | 5/2012 | Pietrzyk et al. |
| 8,515,563 B2 | 8/2013 | Weddingfeld et al. |
| 9,447,536 B2 * | 9/2016 | Tincher ............... A47L 15/4418 |
| 2007/0079871 A1 | 4/2007 | Robinson |
| 2011/0098830 A1 | 4/2011 | Weddingfeld et al. |
| 2013/0023165 A1 | 1/2013 | Sasahara et al. |
| 2015/0245531 A1 * | 8/2015 | Meinecke ............. H02M 3/158 |
| | | 361/679.02 |

* cited by examiner

QUICK-CONNECTOR CONVERSION SYSTEM FOR SAFETY CONTROLLER

TECHNICAL FIELD

Various embodiments relate generally to industrial safety controllers.

BACKGROUND

Safety controllers are essential during operation of potentially dangerous machines. Proper use of safety controllers may increase personnel safety when operating a potentially dangerous machine. Safety controllers may also increase efficiency and productivity. For example, safety controllers may prevent a decrease in the machine's service life by preventing improper use of the machine.

Many safety controllers are configured to receive various types of external devices. For example, a safety controller may be configured to receive an individual safety device such as an emergency stop button. The safety controller may also receive a sensor device. The safety controller may process information received from a sensor device to generate status messages to a user.

Some safety controllers are configurable. For example, a first user may need the safety controller configured only to monitor and generate alerts according to a predetermined set of instructions. A second user may need the safety controller configured to monitor and respond, in accordance with a predetermined set of instructions, if a fault is detected. As such, configurable safety controllers offer users a wide variety of configurable options that a user may configure according to the user's needs.

SUMMARY

Apparatus and associated methods relate to a quick-connector conversion system having a front cover and a rear module. In an illustrative example, the front cover includes apertures from which a plurality of connector ports extend through. Each connector port of the plurality of connector ports is in electrical communication with a first communication module. A rear module includes a second communication module electrically connected to a plurality of input/output (I/O) terminals such that when the front cover aligns with the rear module, the first communication module pluggably connects to the second communication module. When the first communication module and the second communication module are pluggably connected, the plurality of connector ports electrically connects to the plurality of the I/O terminals.

Various embodiments may achieve one or more advantages. For example, some embodiments may simplify necessary wiring between an individual safety device and a safety controller. The quick-connector conversion system may convert screw-type terminals into pluggable connectors to permit a user to more easily connect an individual safety device to a safety controller. The quick-connector conversion system may reduce the potential for miswiring. In some embodiments, the connector ports may differ in size such that only a specific individual safety device may be plugged into a respective connector. For example, a connector port may be disposed on the front cover such that the connector port is the only connector port of its size disposed on the front cover. A specific individual safety device, for example, an e-stop button, may be the only equipped individual safety device to connect to the particular connector port.

In some embodiments, color-coded ports may increase the simplicity of wiring between an individual safety device and a safety controller. For example, a connector port may include a red outline around its periphery to indicate that a specific individual safety device (e.g., e-stop button) be connected to the red outlined connector port. In various embodiments, the exterior surface of the front cover may include indicator lights. The indicator lights may indicate proper connectivity between an individual safety device to a connector port. For example, in the event that an individual safety device is not connected properly to a corresponding connector port, the indicator lights may flash a distinctive pattern to alert a user of the improper connection. In various embodiments, the indicator lights may indicate various information to a user. For example, in the event the first communication modules and second communication modules are not properly connected, the indicator lights may remain illuminated to alert a user of the problem. In some embodiments, the indicator light may illuminate a particular color.

In various embodiments, the first communication module and second communication module may be printed circuit boards (PCBs). In some embodiments, the quick-connector conversion system may retro-fit to existing safety controllers.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, steps illustrating application of an exemplary quick-connector conversion system are briefly introduced with reference to FIG. 1. Second, with reference to FIG. 2, the discussion turns to an exploded view that illustrates the various modules of an exemplary quick-connector conversion system. With reference to FIGS. 3A-4B, further details concerning the connector ports and the device communication modules are discussed in accordance with a front cover. Concerning FIGS. 5A-6, further details concerning a terminal communication module are discussed. FIG. 7 turns the discussion towards a front view of a safety controller coupled to an exemplary quick-connector conversion system. Finally, with reference to FIG. 8, rear covers that provide protection and accessibility to the communication modules are discussed.

Figure 1:
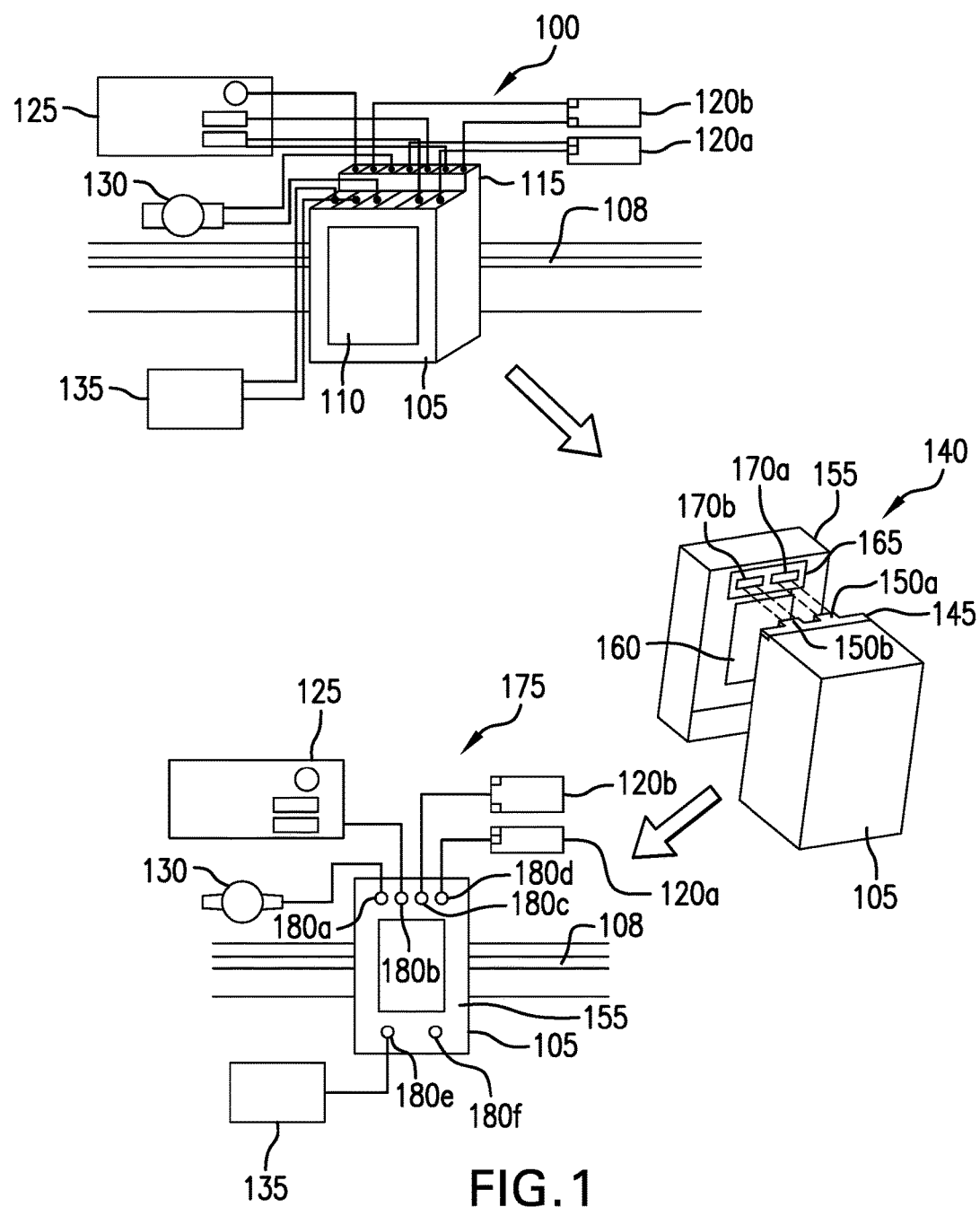
FIG. 1 depicts steps illustrating application of an exemplary quick-connector conversion system.

FIG. 1 depicts steps illustrating application of an exemplary quick-connector conversion system. Steps 100, 140, 175 illustrate the simplification, via the quick-connector conversion system, of connecting multiple independent safety devices to a safety controller 105. At step 100, the safety controller 105 mounts on a DIN rail 108. The safety controller 105 includes a front face 110 for displaying information. The safety controller 105 includes a terminal block 115. As depicted, the terminal block 115 includes terminal connectors. In some embodiments, the terminal connectors may be screw-type terminals. In various embodiments, the terminal connectors may be spring-cage terminals or tension spring terminals. A pair of safety inputs 120a, 120b electronically connect to the terminal block 115. As depicted, both of the safety inputs 120a, 120b include two wired connections to the terminal block 115. A safety light curtain 125 includes four wired connections to the terminal block 115. An emergency stop button 130 includes two wired connections to the terminal block 115 as does a power source 135. In some embodiments, external devices connected to the terminal block may include multi-wired connections exceeding four wired connections. In various embodiments, external devices connected to the terminal block may include a single wired connection, such as, for example, a single wire emergency stop button. In some embodiments, the safety inputs 120a, 120b may be gate switches, such as, for example, magnetic interlock switches.

As depicted at step 140, a quick connector conversion system includes a front cover 155 and a terminal communication module 145. The terminal communication module 145 electrically connects to the terminal block 115. A pair of protrusions 150a, 150b extend from the terminal communication module 145. A front cover 155 includes an aperture 160 to receive the front face 110 of the safety controller 105.

A device communication module 165 is disposed in an interior of the front cover. The device communication module includes a pair of edge connectors 170a, 170b. When the pair of protrusions 150a, 150b align with the pair of edge connectors 170a, 170b, as depicted, the front cover may releasably couple to the safety controller 105 such that the pair of protrusions 150a, 150b electrically connect to the pair of edge connectors 170a, 170b.

At 175, the safety controller 105 releasably couples to the front cover 155. As depicted, six pluggable connector ports 180a-180f are disposed on the front cover 155. The six pluggable connector ports 180a-180f electrically connect to the device communication module 165. The emergency stop button 130 pluggaby connects to the pluggable connector port 180a. The safety light curtain 125 pluggably connects to the pluggable connector port 180b. The safety inputs 120a, 120b pluggably connect to pluggable connector ports 180d, 180c, respectively. The power source 135 pluggably connects to the pluggable connector port 180e. As depicted, the pluggable connector port 180f remains open to receive an external safety device.

In some embodiments, the front cover 155 may be configured such that when coupled to the safety controller 105, the front face 110 forms a continuous plane with an exterior of the front cover 155. A continuous plane between the front face 110 and the exterior of the front cover 155 may permit access to the front face 110 such that a user may read a display more easily by increasing the viewing angle as compared to the front face 110 being recessed within the front cover 155. In some embodiments, the continuous plane between the front face 110 and the exterior of the front cover 155 may permit greater access to buttons that may be disposed on the front face by increasing a button access angle. In various embodiments, the quick-connector system may reduce the number of connections necessary to connect an independent safety device to the safety controller 105. For example, an independent safety device normally requiring four terminal connections to connect to the safety controller 105 may, after the application of the quick-connector system, only require a single pluggable connection.

In some embodiments, the safety controller 105 may be configurable. A configurable safety controller may offer more options to a user. The increased configuration possibilities may increase the wiring complexities for individual safety devices. In various embodiments, the quick-connector conversion system may simplify wiring connections between a configurable safety controller and an individual safety device.

Figure 2:
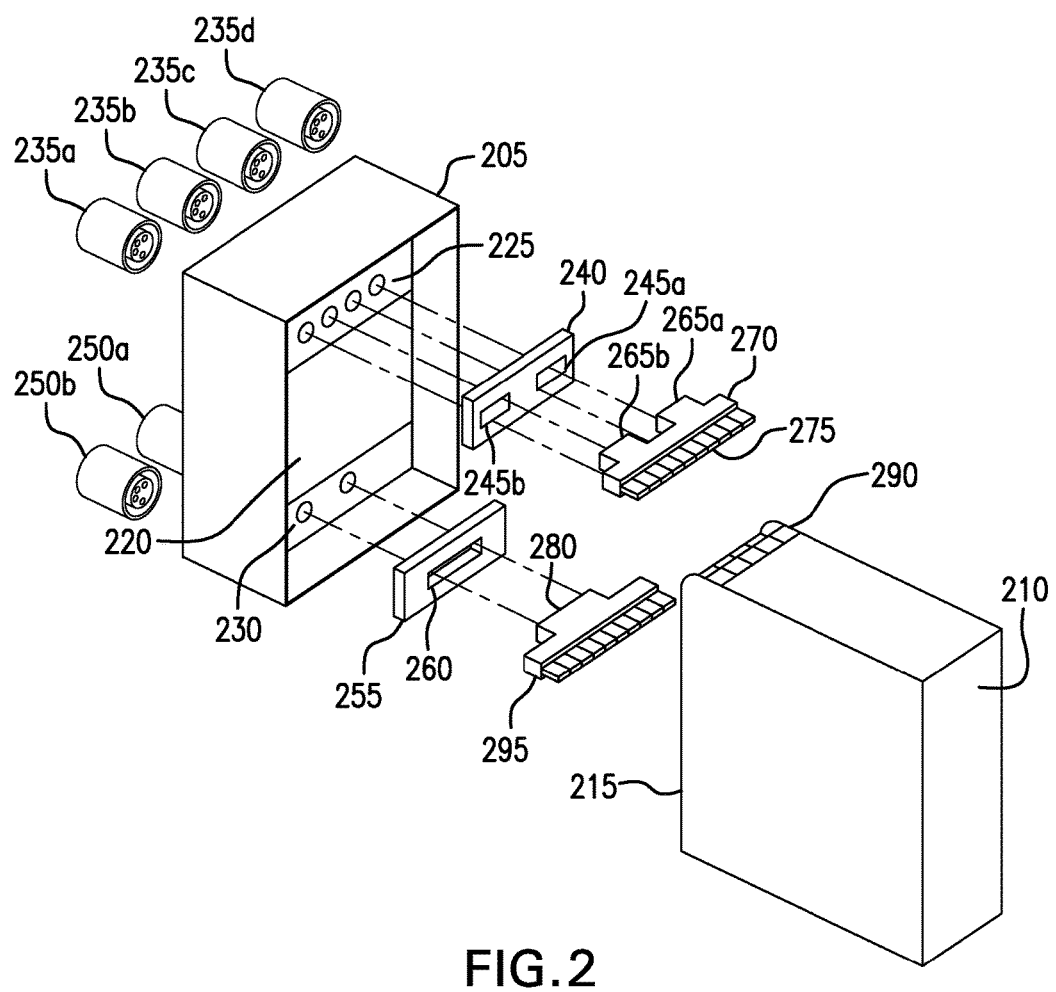
FIG. 2 depicts an exploded view of an exemplary quick-connector conversion system and a safety controller.

FIG. 2 depicts an exploded view of an exemplary quick-connector conversion system and a safety controller. A front cover 205 includes an open end to receive a safety controller 210 such that when the front cover 205 releasably couples to the safety controller 210, a display face 215 of the safety controller 210 aligns with an aperture 220 of the front cover 205 to permit access to the display face 215. As depicted, the front cover 205 includes an upper wall 225 and a lower wall 230 that define the aperture 220.

The upper wall 225 includes four apertures that align with four connector ports 235a-235d at an exterior of the front cover 205. The connector ports 235a-235d further align, through the apertures of the upper wall 225, to an upper device communication module 240 that is at an interior of the front cover 205. As depicted, the upper device communication module 240 includes a pair of female connectors 245a, 245b. The lower wall 230 includes two apertures that align with two connector ports 250a, 250b, the two connector ports 250a, 250b disposed at an exterior of the front cover 205. The connector ports 250a, 250b further align, through the apertures of the lower wall 230, to a lower device communication module 255 that is disposed at an interior of the front cover 205. The lower device communication module 255 includes a female connector 260.

The female connectors 245a, 245b align with a pair of male connectors 265a, 265b, respectively. The male connectors 265a, 265b extend from an upper rear terminal communication module 270. As depicted, the upper rear terminal communication module 270 includes a set of pins 275 configured to electrically couple to an upper terminal block 290. The female connector 260 aligns with a male connector 280. The male connector 280 extends from a lower rear terminal communication module 295. As depicted, the lower rear terminal communication module 295 includes a set of pins configured to electrically couple to a lower terminal block (not shown). As depicted, the female connector 260 and the male connector 280 comprise a rigid card edge type connection. The female connectors 245a, 245b and the male connectors 265a, 265b also comprise rigid card edge type connections.

In various embodiments, the connector ports 235a-235d may differ in size and shape. In some embodiments, the connector ports 235a-235d may be arranged in a non-linear pattern. The front cover 205 may include apertures on the upper wall 225 arranged in a corresponding non-linear pattern. In various embodiments, the number of connector ports aligned with the upper wall 225 may exceed or be less than the depicted four connector ports 235a-235d. In some embodiments, the number of connector ports aligned with the lower wall 230 may also exceed or be less than the depicted two connector ports 250a, 250b.

In some embodiments, the female connectors may be male connectors and the male connectors may be female connectors. For example, the upper device communication module 240 may include male connectors instead of the female connectors 245a, 245b. The upper rear terminal communication module 270 may include female connectors instead of the male connectors 265a, 265b. In various embodiments, the connection between male connectors and female connectors may be via flexible circuit board.

Figure 3A:
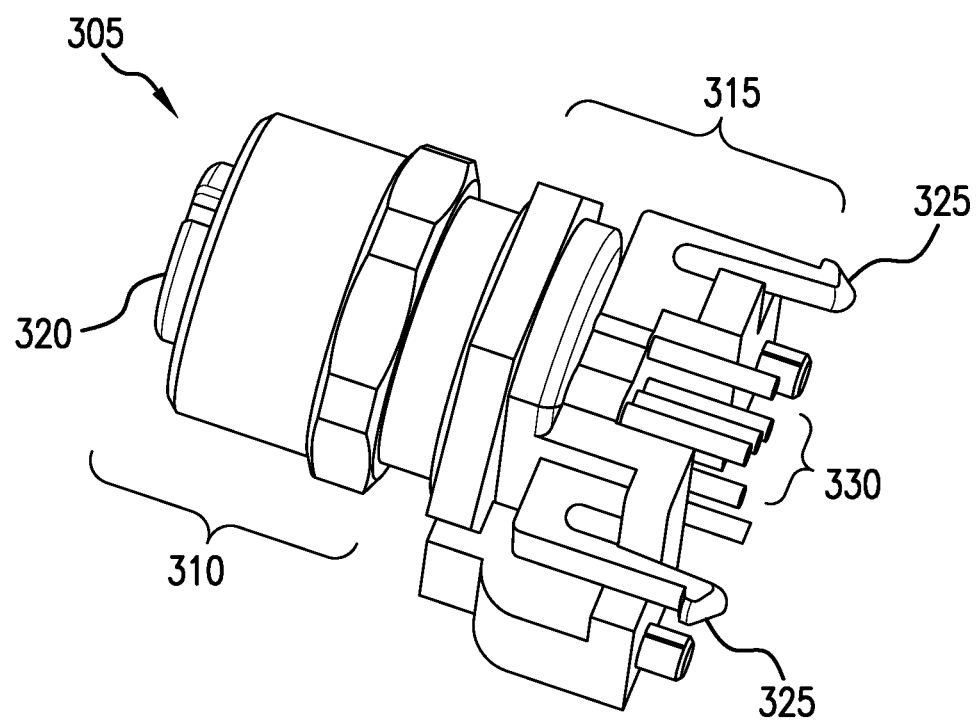
FIG. 3A depicts a perspective view of a connector port configured for use with an exemplary quick-connector conversion system.

FIG. 3A depicts a perspective view of a connector port configured for use with an exemplary quick-connector conversion system. As depicted, a connector includes a top portion 310 and a bottom portion 315. The top portion 310 includes a receiving end 320 configured to receive an electrical connection for an external device. The bottom portion 315 includes fastening devices 325 and a set of pins 330. As depicted, the fastening devices 325 may be snap-in fasteners. In some embodiments, various connections may be used, such as, for example, soldered connections or threaded fasteners.

Figure 3B:
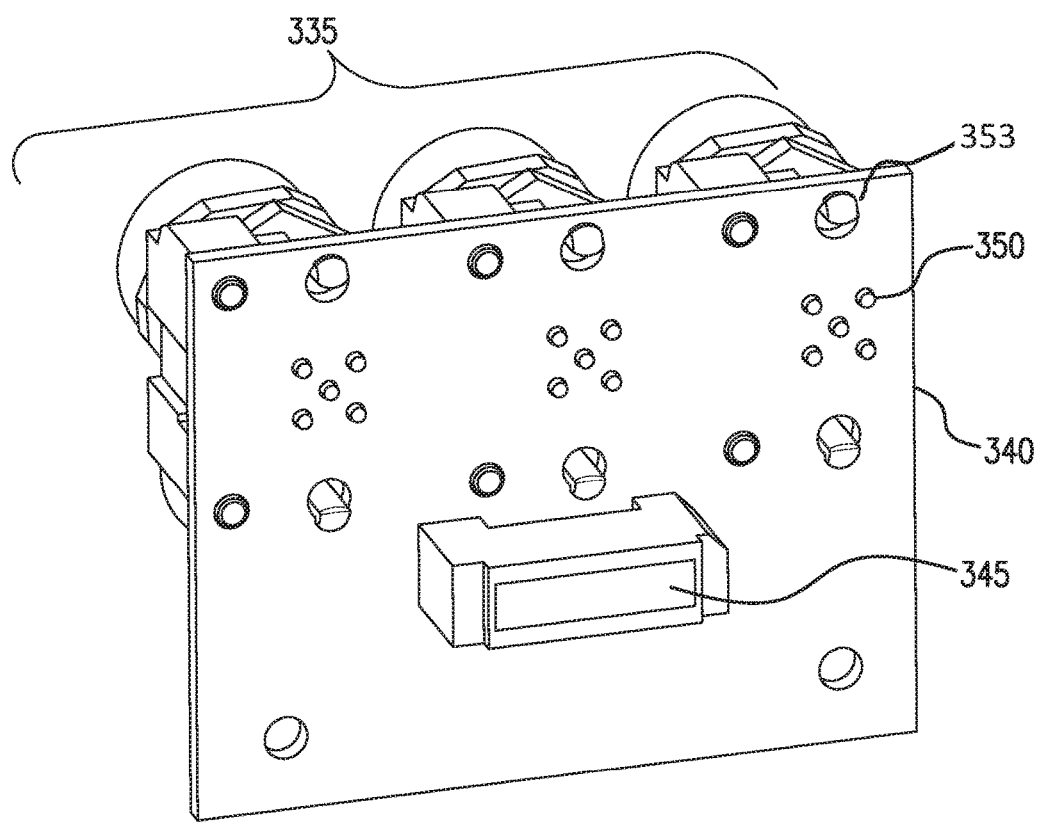
FIG. 3B depicts a rear perspective view of a plurality of connector ports electrically connected to a device communication module for use with an exemplary quick-connector conversion system.

FIG. 3B depicts a rear perspective view of a plurality of connector ports electrically connected to a device communication module for use with an exemplary quick-connector conversion system. A plurality of connector ports 335 electrically connects to a device communication module 340. The device communication module 340 includes a female connector port 345. As depicted, the device communication module 340 is substantially square. Each connector 335 electrically connects to the device communication module 340 via a set of pins 350 corresponding to each connector port 335. As depicted, each connector port 335 includes fastening devices 353. The fastening devices 353 secure the connector ports 335 to the device communication module 340. As depicted, the connector ports 335 are linearly arranged along a top edge of the device communication module 340.

Figure 3C:
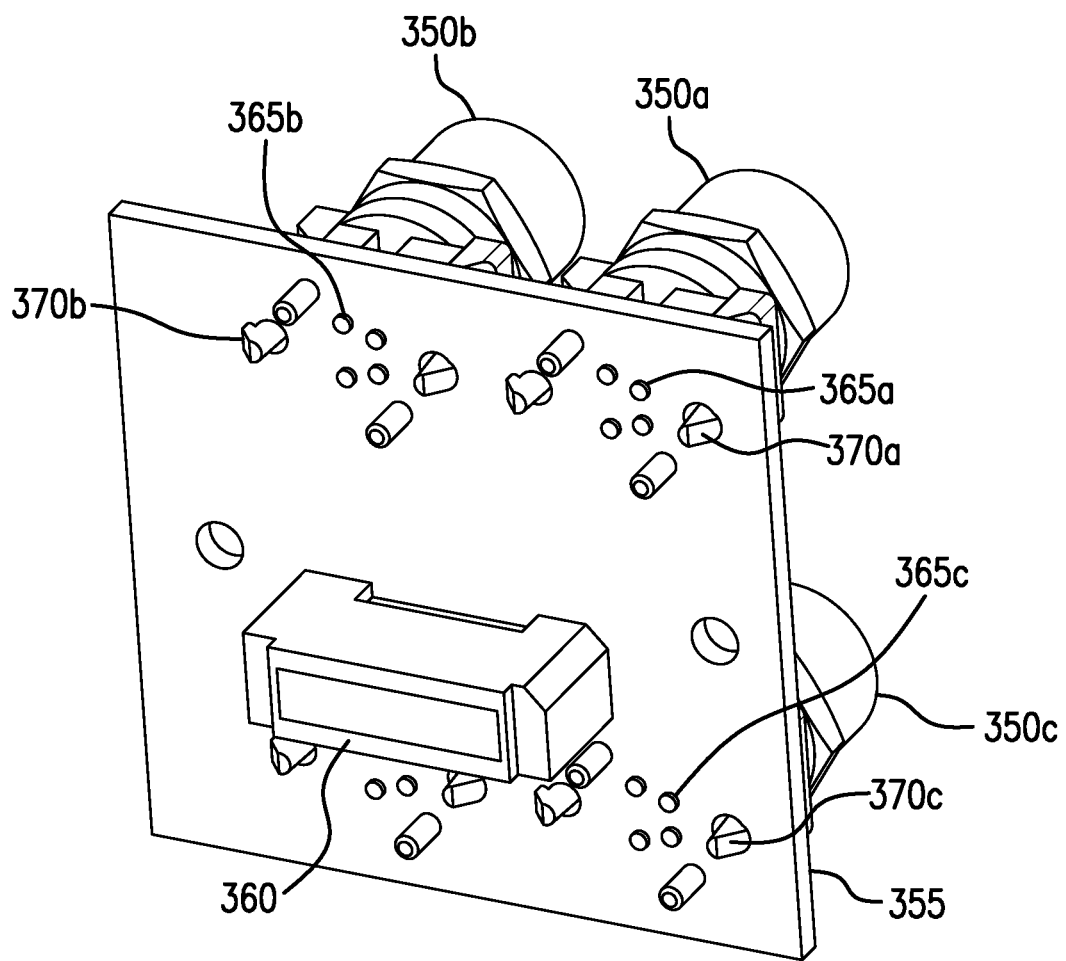
FIG. 3C depicts a rear perspective view of a plurality of connector ports arranged in two rows on a device communication module for use with an exemplary quick-connector conversion system.

FIG. 3C depicts a rear perspective view of a plurality of connector ports arranged in two rows on a device communication module for use with an exemplary quick-connector conversion system. Three connector ports 350a-350c electrically connect to a device communication module 355. The device communication module 355 includes a female connector port 360. As depicted, the device communication module 355 is substantially square. Each connector port 350a-350c electrically connects to the device communication module 355 via a set of pins 365a-365c corresponding to each connector port 350a-350c. As depicted, each connector port 350a-350c includes fastening devices 370a-370c. The fastening devices 370a-370c secure the connectors ports 350a-350c to the device communication module 355. As depicted, connector ports 350a, 350b are linearly arranged along a top edge of the device communication module 355. The connector port 350c electrically connects to the device communication module 355 below the connector port 350a.

Figure 3D:
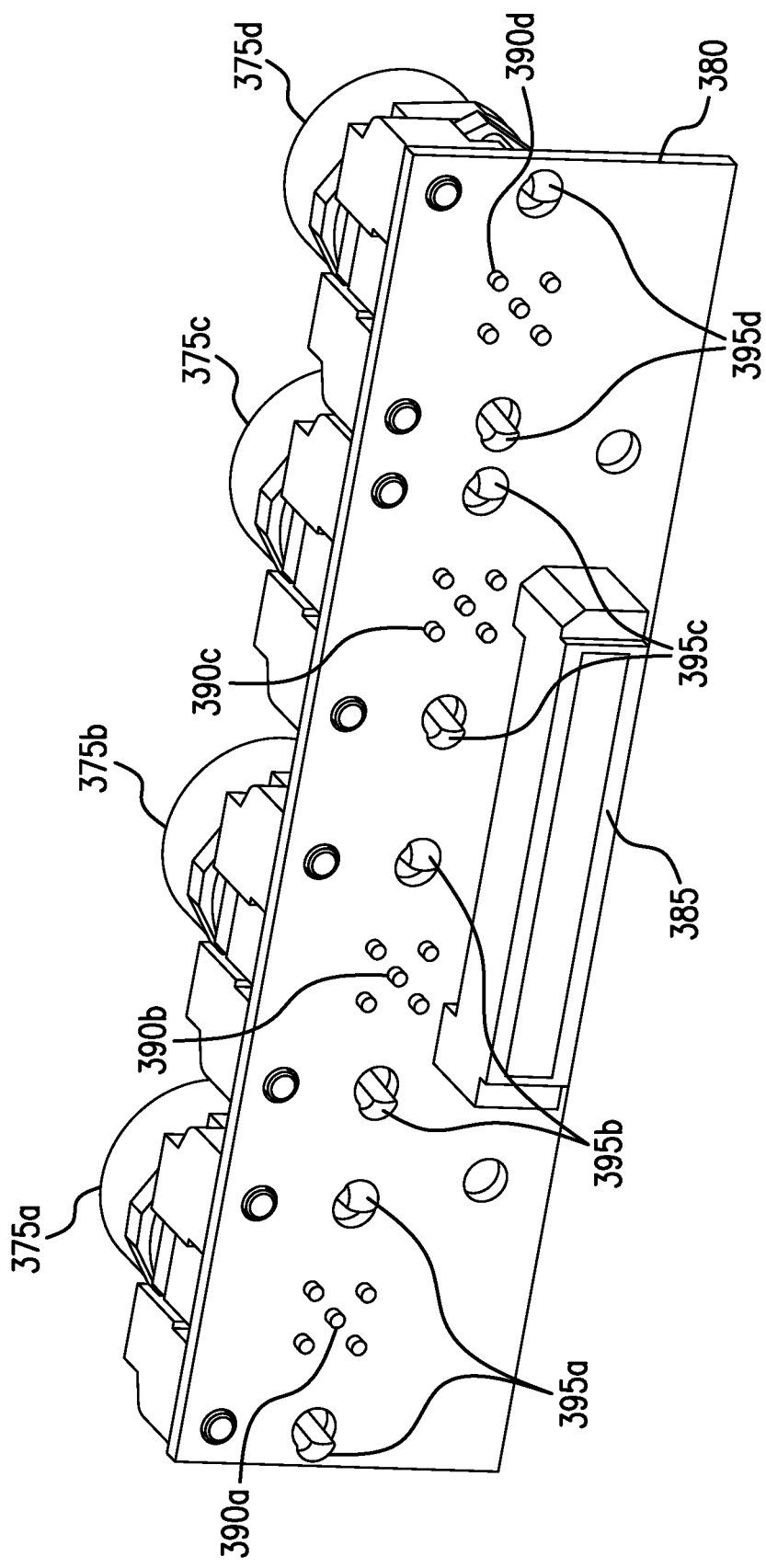
FIG. 3D depicts a rear perspective view of a plurality of connector ports arranged in a single row on a substantially rectangular device communication module for use with an exemplary quick-connector conversion system.

FIG. 3D depicts a rear perspective view of a plurality of connector ports arranged in a single row on a substantially rectangular device communication module for use with an exemplary quick-connector conversion system. Four connector ports 375a-375d electrically connect to a device communication module 380. The device communication module 380 includes a female connector port 385. As depicted, the device communication module 380 is substantially rectangular. Each connector port 375a-375d electrically connects to the device communication module 380 via a set of pins 390a-390d corresponding to each connector port 375a-375d. As depicted, each connector port 375a-375d includes fastening devices 395a-395d. The fastening devices 395a-395d secure the connector ports 375a-375d to the device communication module 380. As depicted, the four connector ports 375a-375d are linearly arranged.

In some embodiments, the four connector ports 375a-375d linearly arranged along the device communication module 380 may be mounted on a lower wall of a front cover. The substantially square device communication module 340 with the three linearly arranged connector ports 335 may be mounted on an upper wall of a front cover. In various embodiments, the connector ports 350a-350c arranged non-linearly on the device communication module 355 may be mounted on an upper wall of the front cover alongside another device communication module. For example, device communication modules 340, 355 may both be mounted on an upper wall of a front cover. In some embodiments, a device communication module may be of various shapes, such as, for example, a circle.

Figure 4A:
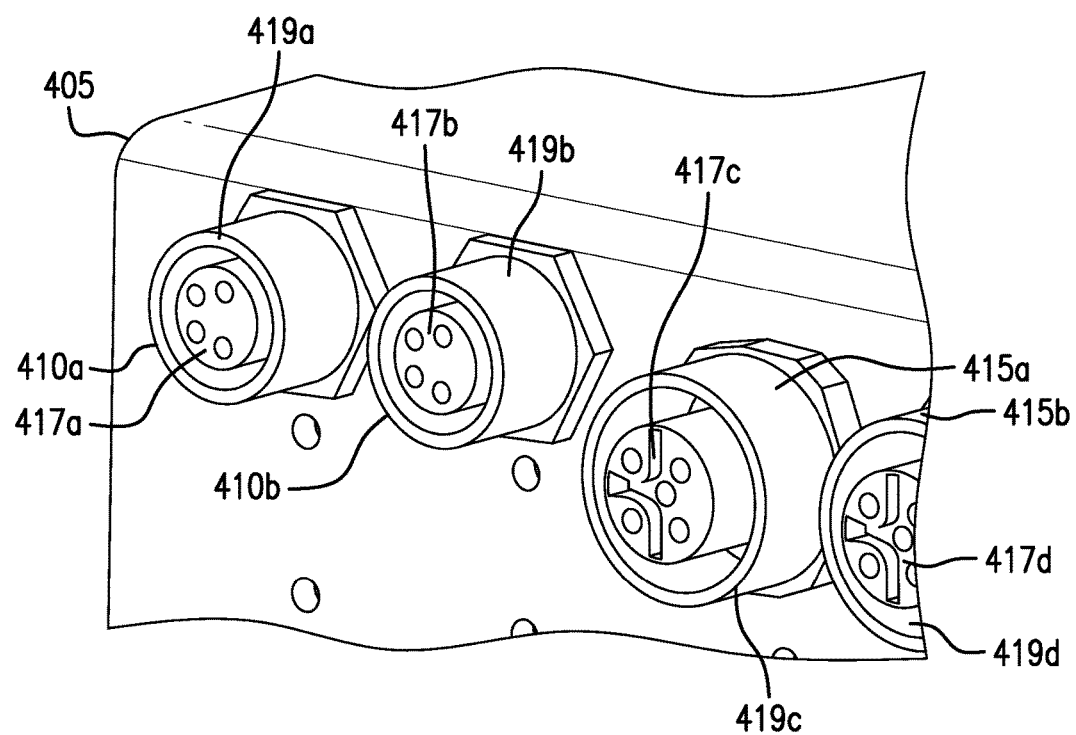
FIG. 4A depicts a front perspective view of connector ports disposed on an exemplary front cover.

FIG. 4A depicts a front perspective view of connector ports disposed on an exemplary front cover. A front cover 405 includes four connector ports 410a, 410b, 415a, 415b disposed on an exterior of the front cover 405. A top portion of the connector ports 410a, 410b, 415a, 415b remains accessible via the exterior of the front cover 405. As depicted, the connector ports 410a, 410b differ in size and shape in comparison to connector ports 415a, 415b. In some embodiments, different sized and shaped connector ports may simplify connecting an individual safety device into a safety controller. As depicted, the connector ports 410a, 410b, 415a, 415b include a socket projecting member 417a-417d disposed within an outer ring 419a-419d of each of the connector ports 410a, 410b, 415a, 415b. In various embodiments, the outer ringes 419a-419d and socket projecting members 417a-417d may be color-coded to simplify connecting an external device to a safety controller. Each individual outer ring 419a-419d and each individual socket projecting member 417a-417d may be color-coded differently.

Figure 4B:
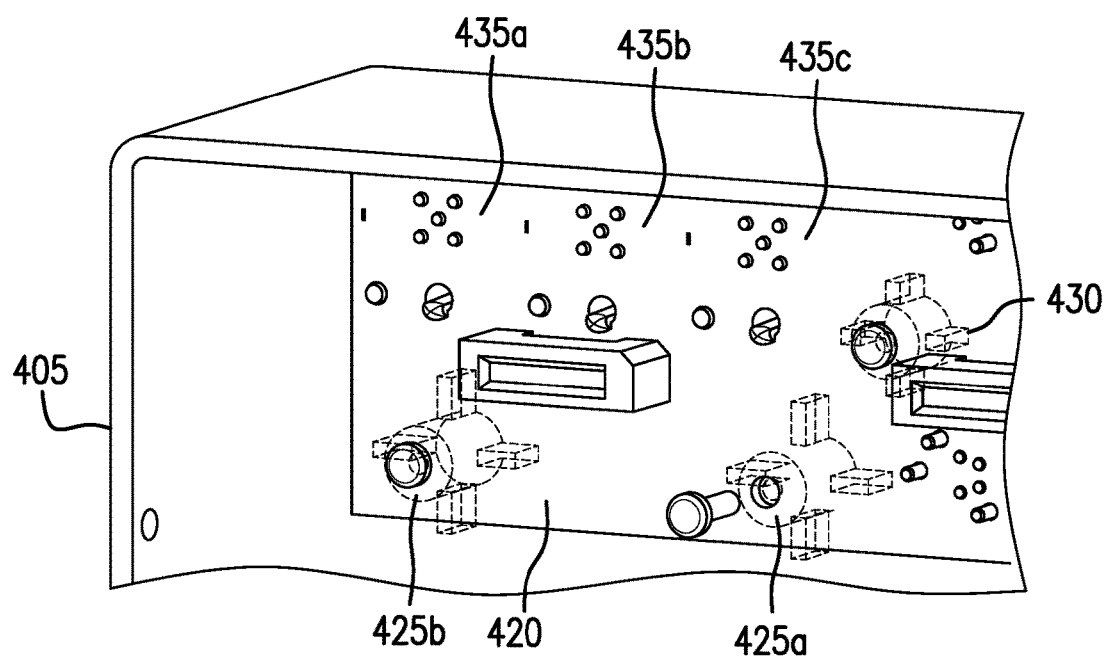
FIG. 4B depicts a back perspective view of a device communication module disposed within an interior of an exemplary front cover.

FIG. 4B depicts a back perspective view of a device communication module disposed within an interior of an exemplary front cover. A device communication module 420 mounts in an interior of the front cover 405. Mounting devices 425a, 425b secure the device communication module 420 inside the interior of the front cover 405. As depicted, the device communication module 420 electrically couples to three connector ports (not shown), as identified by the set of pins and fastening devices disposed on the device communication module 420. As depicted, a second device communication module 430 mounts in the interior of the front cover 405 beside the device communication module 420. The second device communication module indicates at least a pair of connector ports such that one of the connector ports is on top of the other. In some embodiments, the connector ports may be arranged to simplify connections to a safety controller.

Figure 5A:
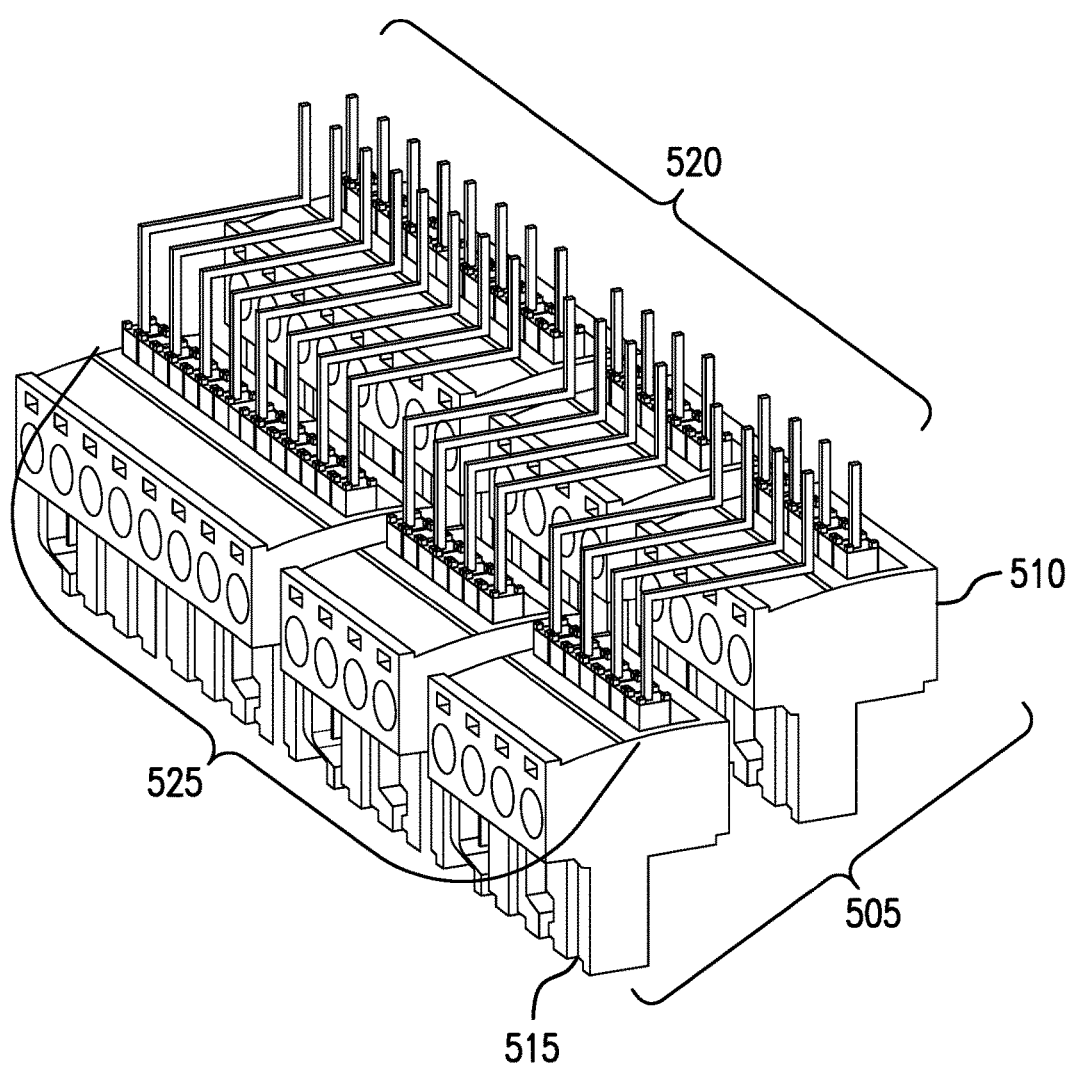
FIG. 5A depicts a perspective view of a terminal block wired to receive an exemplary terminal communication module.

FIG. 5A depicts a perspective view of a terminal block wired to receive an exemplary terminal communication module. A terminal block 505 includes a top row 510 and bottom row 515 of input/output (IO) terminals. At the top row 510, a proximal end of straight lined wires 520 is electrically connected to the I/O terminals. At the bottom row 515, a proximal end of opposing L-shaped wires 525 is electrically connected to the I/O terminals. As depicted, the distal ends of both the straight lined wires 520 and the opposing L-shaped wires 525 extend to a substantially similar height above the top row 510. In various embodiments, the wires 520, 525 may be angled, straight, or a combination thereof.

Figure 5B:
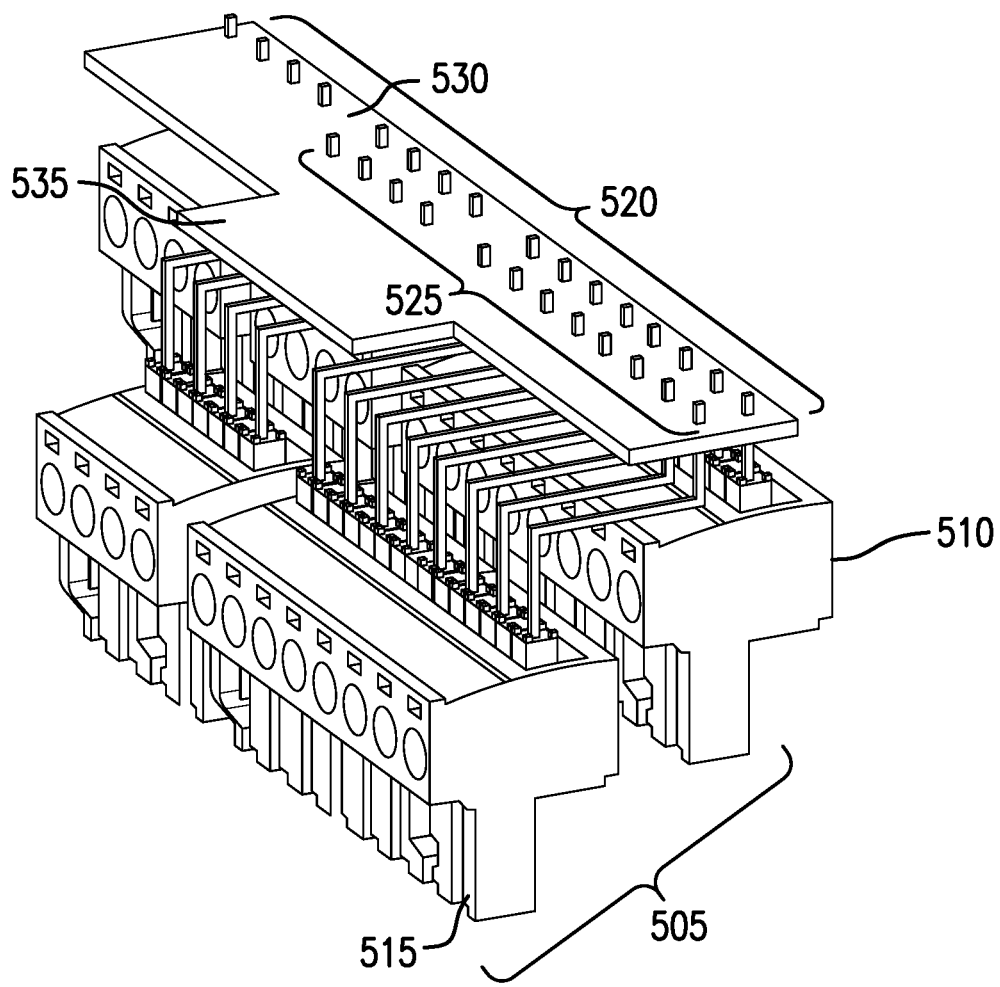
FIG. 5B depicts a perspective view of an exemplary terminal communication module electrically connected to a terminal block.

FIG. 5B depicts a perspective view of an exemplary terminal communication module electrically connected to a terminal block. The terminal block 505 electrically connects, via the straight lined wires 520 and the opposing L-shaped wires 525, to a terminal communication module 530. As depicted, the distal end of the straight lined wires 520 and the opposing L-shaped wires 525 connects to the terminal communication module 530. A male connector 535 extends from the terminal communication module 530. In various embodiments, the male connector 535 may plug into the female connector 385 such that when the male connector 535 and the female connector 385 are pluggably connected, the I/O terminals of the terminal block 505 are in electrical communication with connector ports 375a-375d.

Figure 6:
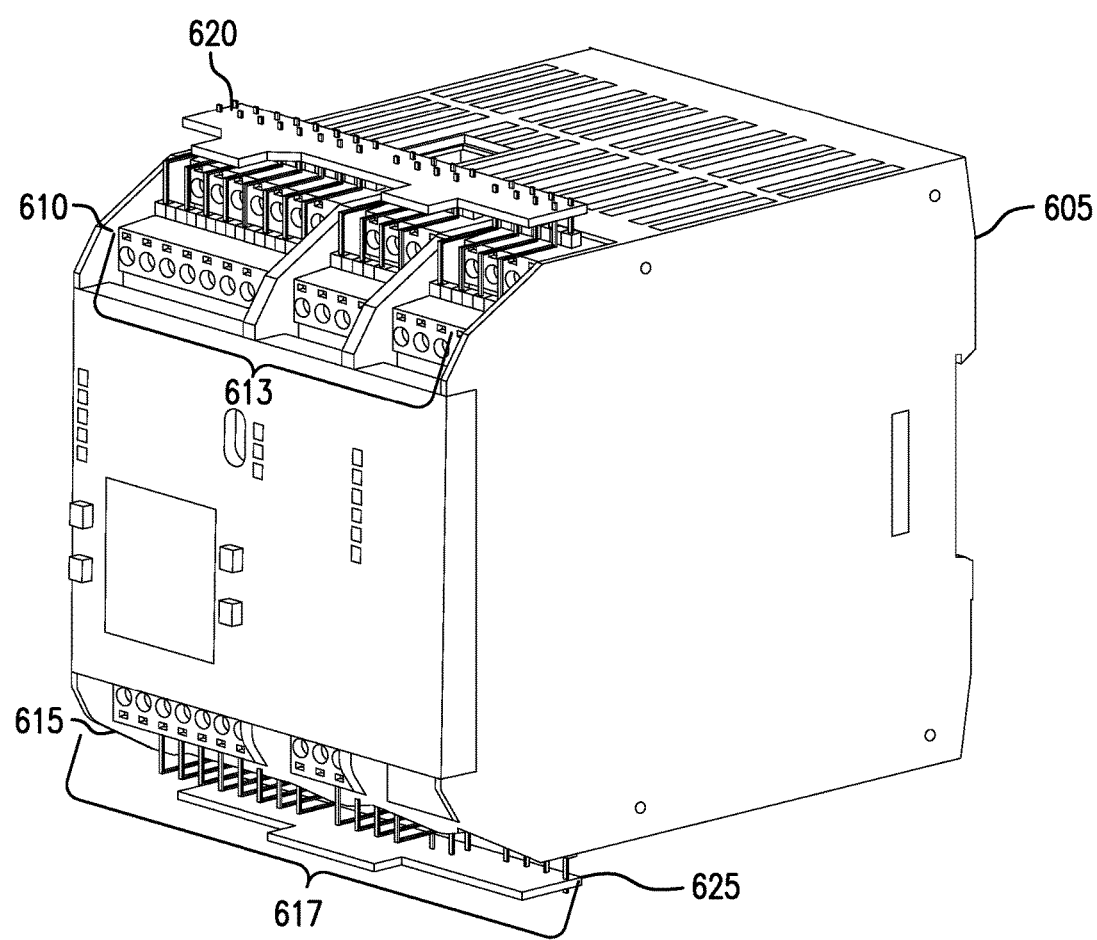
FIG. 6 depicts a perspective view of exemplary terminal communication modules mounted on a safety controller.
Figure 7:
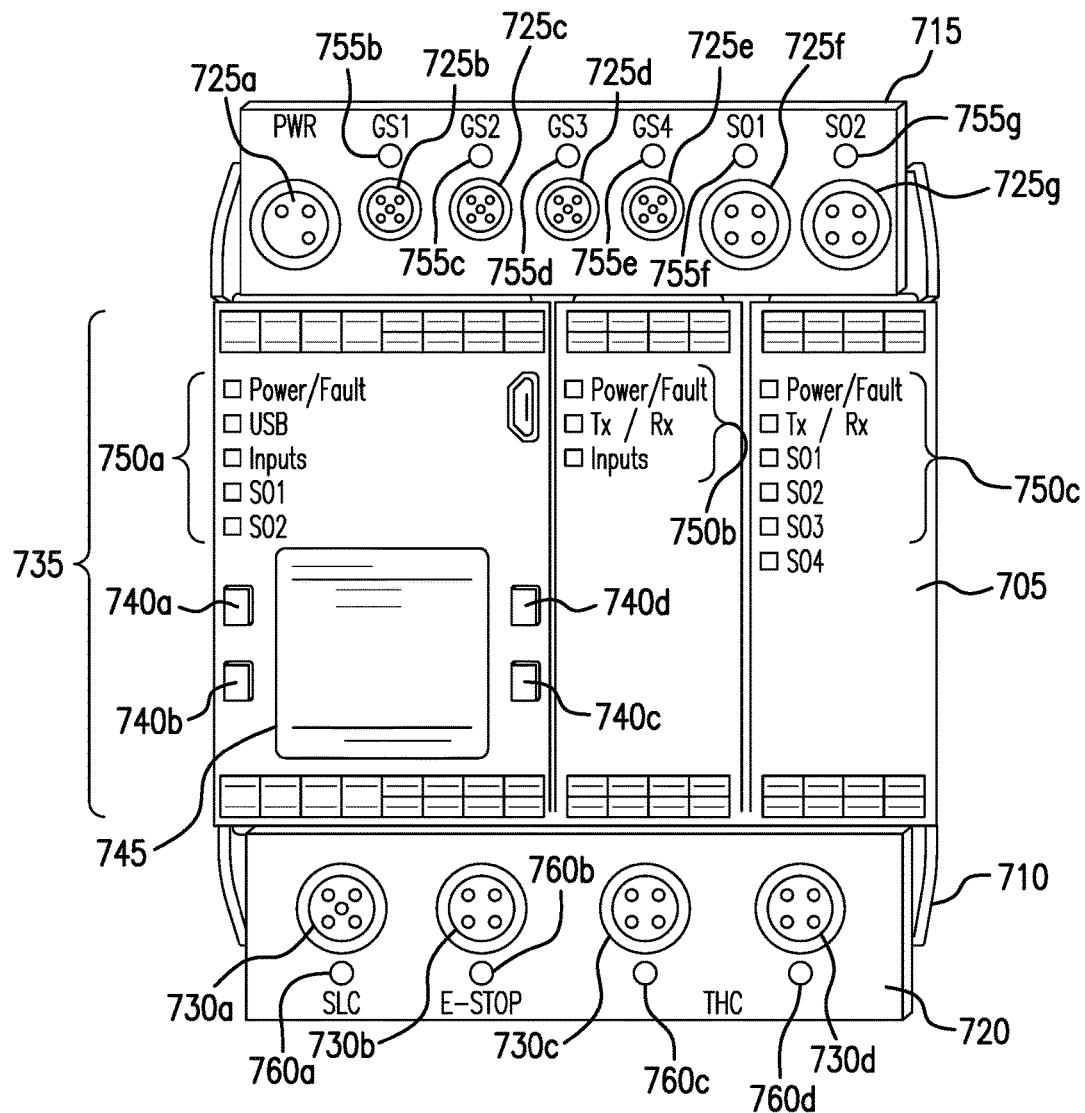
FIG. 7 depicts a front view of an exemplary front cover of a quick-connector conversion system coupled to a safety controller.

FIG. 6 depicts a perspective view of exemplary terminal communication modules mounted on a safety controller. A safety controller 605 includes a top terminal block 610 and a bottom terminal block 615. Each terminal block 610, 615 includes a plurality of I/O terminals 613, 617, respectively. A top terminal communication module 620 electrically connects, via distal ends of straight lined wires and opposing L-shaped wires connected to the plurality of I/O terminals 613 of the top terminal block 610, to the safety controller 605. A bottom terminal communication module 625 electrically connects, via distal ends of straight lined wires and opposing L-shaped wires (such as 520, 525) connected to the plurality of I/O terminals 617 of the bottom terminal block 615, to the safety controller 605. As depicted, the coupling of the terminal communication modules 620, 625 to the safety controller 605 indicates the safety controller 605 is configured to receive a front cover of a quick-connector conversion system.

FIG. 7 depicts a front view of an exemplary front cover of a quick-connector conversion system coupled to a safety controller. A display face 705 of a safety controller aligns with an aperture of a front cover 710. A top area 715 and a bottom area 720 of the front cover 710 define the aperture through which the display face 705 is accessible. The top area 715 includes various connector ports 725a-725g. The connector ports 725a-725g electrically connect to the safety controller 705, via an upper device communication module electrically connected to a rear upper terminal communication module (not shown).

As depicted, the connector ports 725a-725g are configured to receive a corresponding pluggable connector. For example, the connector port 725a may be configured to receive a corresponding connector for a power source. As depicted, the connector port 725a differs from the connector ports 725b-725g. For example, the connector port 725a is larger than connector ports 725b-725e. While the same size as connector ports 725f, 725g, the connector port 725a is configured to receive a three-prong connection, as indicated by the three apertures of the connector port 725a. The connector ports 725f, 725g are configured to receive four-prong connections, though it is contemplated that various numbers of prong connections may be anticipated.

A ring outlines the periphery of each of the connector ports 725a-725g. In some embodiments, the ring may be used to color code the connector ports 725a-725g. For example, the ring outlining the connector port 725a may be black to indicate that connector port 725a is configured to receive a power source. The rings outlining the connector ports 725b-725e may be yellow to indicate that the connector ports 725b-725e are configured to receive specific safety devices. The rings outlining the connector ports 725f, 725g may be a different color (e.g., white) to indicate the connector ports 725f, 725g are configured to receive monitoring devices. In some embodiments, only socket projecting members (such as 417a-417d) may be color-coded. In various embodiments, both the ring outlines and the socket projecting members may be color-coded.

The bottom area 720 includes various connector ports 730a-730d. The connector ports 730a-730d electrically connect to the safety controller 705, via a lower device communication module electrically connected to a rear lower terminal communication module (not shown). A ring outlines the periphery of each of the connector ports 730a-730d. Each ring outline may be color-coded to indicate a specific device to be connected to connector port 730a-730d. For example, the ring outlining connector port 730d may be red to indicate that only an E-stop button may be connected to the connector port 730d. In various embodiments, the connector ports 730a-730d may differ in size and shape. As depicted, connector port 730a is configured to receive a five-prong connection. The connector ports 730b-730d are configured to receive four-prong connections.

The safety controller 705 includes a display face 735 accessible via an aperture in the front cover 710 defined by the top area 715 and the bottom area 720. The display face 735 includes input buttons 740a-740d. The input buttons 740a, 740b may be configured to input decisions to the safety controller 705. For example, the input button 740a may be an "OK" button such that a user may use the "OK" button to select an operation or command to the safety controller. The input buttons 740c, 740d may be configured to navigate a menu 745 of the display face 735. For example, the input button 740c may input a scroll up command while the input button 740d may input a scroll down command.

The display face 735 may include sets of indicator lights 750a-750c. The set of indicator lights may be configured to alert a user when a fault has occurred. Each indicator light of the set of indicator lights 750a-750c may indicate a unique setting. For example, an indicator light of the set of indicator lights 750a may indicate whether a particular device is properly connected or whether the particular device is properly operating. As such, the indicator light of the set of indicator lights 750a may decrease required maintenance because a user may be able to easily identify the faulty connection or the faulty device. As depicted, the top area 715 includes indicator lights 755b-755g. The indicator lights 755b-755g each correspond to a connector port 725b-725g. For example, indicator light 755b corresponds to connector port 725b and so forth. The indicator lights 755b-755g may further indicate information about a device connected to a respective connector port 725b-725g. For example, indicator light 755b (GS1) does not have a corresponding indicator light in any of the sets of indicators lights 750a-750c on the display face 735. As such, indicator light 755b may indicate information about connector port 725b that may not be found on the display face 735. The bottom area 720 includes indicator lights 760a-760d. Each indicator light 760a-760d corresponding to connector ports 730a-730d respectively. In various embodiments, the indicator lights 755b-755g, 760a-760d may indicate information about the respective connector ports 725b-725g, 730a-730d.

In some embodiments, the rings outlining the connector ports 725a-725g, 730a-730d may be indicator lights configured to light a particular color to indicate a proper electrical connection. For example, when an individual safety device electrically connects to a connector port, the ring outlining the connector port may illuminate green. If the individual safety device improperly connects (e.g., electrical connection not accomplished) to a connector port, the ring outlining the connector port may illuminate red.

Figure 8:
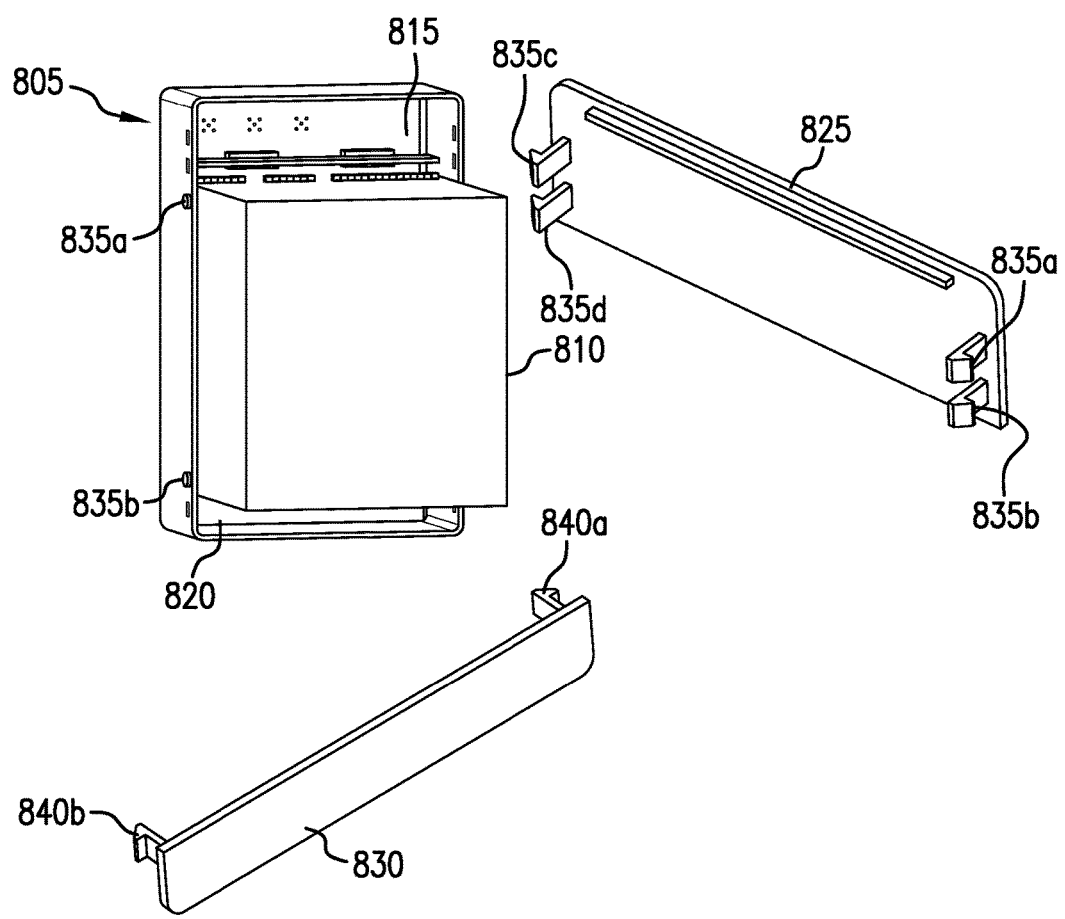
FIG. 8 depicts a rear perspective view of back covers for an exemplary quick-connector conversion system coupled to a safety controller.

FIG. 8 depicts a rear perspective view of back covers for an exemplary quick-connector conversion system coupled to a safety controller. A quick-connector conversion system releasably couples, via screws 835a, 835b, to a safety controller 810. As depicted, when the quick-connector conversion system couples to the safety controller 810, a top rear area 815 and a bottom rear area 820 remain exposed. A top rear cover 825 is configured to couple to a front cover of the quick-connector conversion system such that when coupled, the top rear area 815 is covered. A bottom rear cover 830 is configured to couple to a front cover of the quick-connector conversion system such that when coupled, the bottom rear area 820 is covered.

As depicted, the top rear cover 825 and the bottom rear cover 830 include snap-on fasteners to couple to the front cover. In some embodiments, the top rear cover 825 and the bottom rear cover 830 may include different fastening devices. For example, the top rear cover 825 and the bottom rear cover 830 may be configured to receive screws to couple to the front cover. In various embodiments, the top rear cover 825 and the bottom rear cover 830 may increase the accessibility to a device communication module and a terminal communication module. For example, a user may only need to remove either the top rear cover 825 or the bottom rear cover 830 to access a device communication module and a terminal communication module without having to disassemble the quick-connector conversion system from the safety controller 810. In some embodiments, the top rear cover 825 and the bottom rear cover 830 may provide protection to a device communication module and a terminal communication module because the top rear cover 825 and the bottom rear cover 830 may shield the device communication module and the terminal communication module against environmental hazards.

In various embodiments, the front cover of the quick-connector conversion system may releasably couple to the safety controller 810 such that no tools are required to the releasably couple the front cover and the safety controller 810. For example, the front cover may be configured to receive snap-on fasteners from the safety controller 810 such that only a user exerted force is required.

Figure 9:
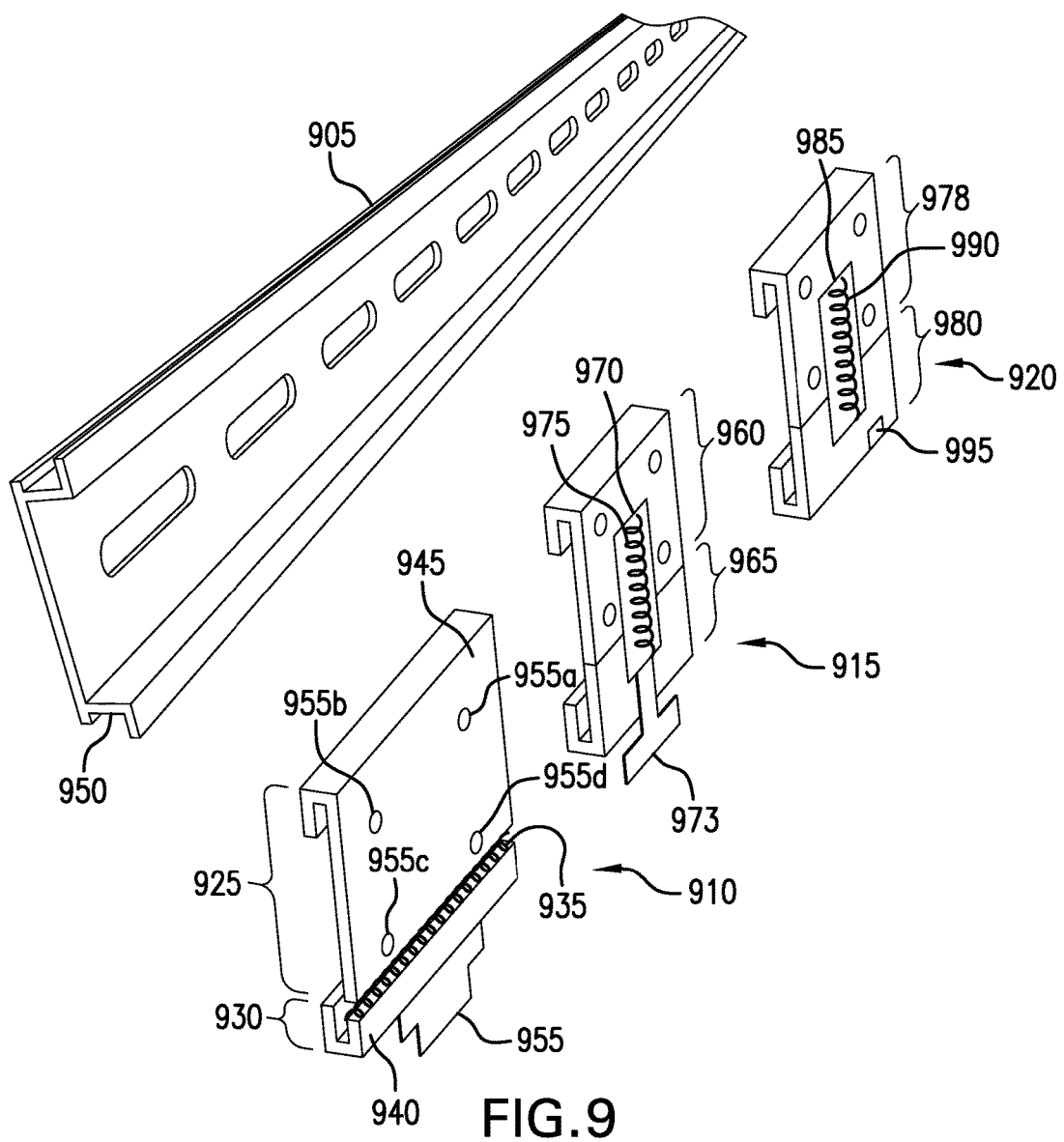
FIG. 9 depicts a perspective view of releasable fastening systems for mounting a quick connecter conversion system to a DIN rail.

FIG. 9 depicts a perspective view of releasable fastening systems for mounting a quick connecter conversion system to a DIN rail. A DIN rail 905 aligns to a spring hinge fastening system 910, a lever-release spring-biased fastening system 915, and a button-release spring-biased fastening system 920. The spring hinge fastening system 910 includes a top portion 925 and a bottom portion 930. The top portion 925 hingedly connects to the bottom portion 930. A spring 935 exerts a force on the bottom portion 930 such that a lower back surface 940 of the bottom portion 930 aligns with an upper back surface 945 of the top portion 925. In some embodiments, when the spring hinge fastening system 910 mounts on the DIN rail 905, the spring 935 exerts a force such that the bottom portion 930 releaseably couples to a lower edge 950 of the DIN rail 905. A lever 955 extends from the bottom portion 930. In various embodiments, the lever 955 may be configured such that, when actuated, the lever counters the force exerted by the spring 935 causing the bottom portion to uncouple from the DIN rail 905. As depicted, the spring hinge fastening system 910 includes apertures 955a-955d. The apertures 955a-955d may be configured to releasably receive a safety controller.

The lever-release spring-biased fastening system 915 includes a top portion 960 and a bottom portion 965. The top portion 960 and the bottom portion 965 attach to a spring mechanism 970 such that when a spring 975 extends a force exerted from the spring mechanism 970 pulls the top portion 960 and the bottom portion 965 towards each other to securely mount the lever-release spring-biased fastening system 915 on the DIN rail 905. A release lever 973 couples to the spring 975 of the spring mechanism 970 such that when a force applied to the release lever 973 causes the spring 975 to compress. When the spring 975 compresses, the top portion 960 and the bottom portion 965 push away from each other.

The button-release spring-biased fastening system 920 includes a top portion 978 and a bottom portion 980. The top portion 978 and the bottom portion 980 attach to a spring mechanism 985 such that when a spring 990 compresses, a lock is activated. The compressed spring may exert a force that pulls the top portion 978 and the bottom portion 980 towards each other such that the button-release spring-biased fastening system 920 securely mounts on the DIN rail 905. A release button 995 couples to the spring mechanism 985 such that when the release button 995 is activated, the lock is deactivated causing the spring 990 to expand. When the spring 990 expands, the top portion 978 and the bottom portion 980 may push away from each other. In various embodiments, the release button 995 may be disposed in a recessed surface of a bottom end of the button-release spring-biased fastening system 920. The recessed surface may permit a user to locate the release button 995 without being able to see the release button 995. The recessed surface may reduce the need to disassemble the button-release spring-biased fastening system 920 in order to remove a safety controller from a DIN rail.

Figure 10A:
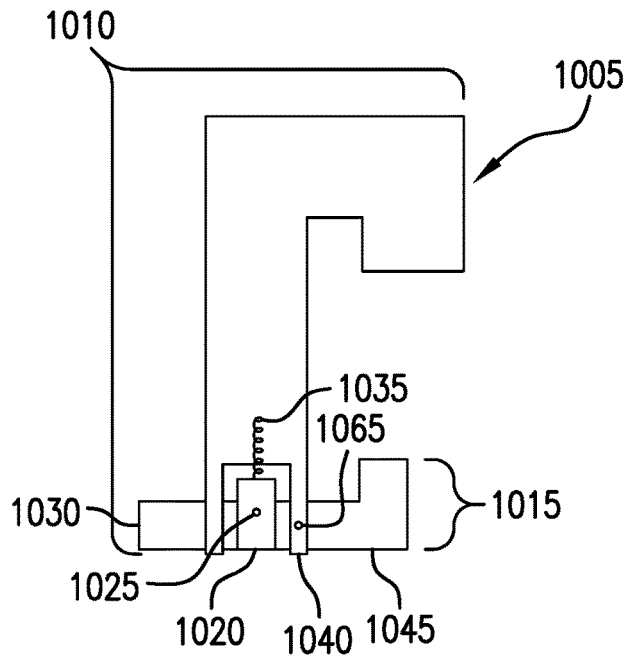
FIG. 10A depicts a side view of an exemplary pivotably releasable hinge fastening system with an uncompressed spring.

FIG. 10A depicts a side view of an exemplary pivotably releasable hinge fastening system with an uncompressed spring. A pivotably releasable hinge fastening system 1005 top portion includes a hook-shaped top portion 1010. A bottom portion 1015 pivotably attaches to a release button 1020 at a pivot point 1025 disposed within a release channel 1030. The release button 1020 attaches to a spring 1035. As depicted, the spring 1035 extends pushing the release button 1020 towards a bottom edge 1040. In response to the release button 1020 being pushed towards the bottom edge 1040, the pivot point 1025 travels towards the bottom edge 1040 such that a bottom surface 1045 of the portion 1015 substantially aligns with the bottom edge 1040. In some embodiments, the pivotably releasable hinge fastening system 1005 may lock onto a lower edge 950 of the DIN rail 905 when the spring 1035 pushes the release button 1020 towards the bottom edge 1040. In various embodiments, the release button 1020 may be recessed within the bottom edge 1040 to create a recessed surface for a user to more easily locate the release button 1020 without the need of sight.

Figure 10B:
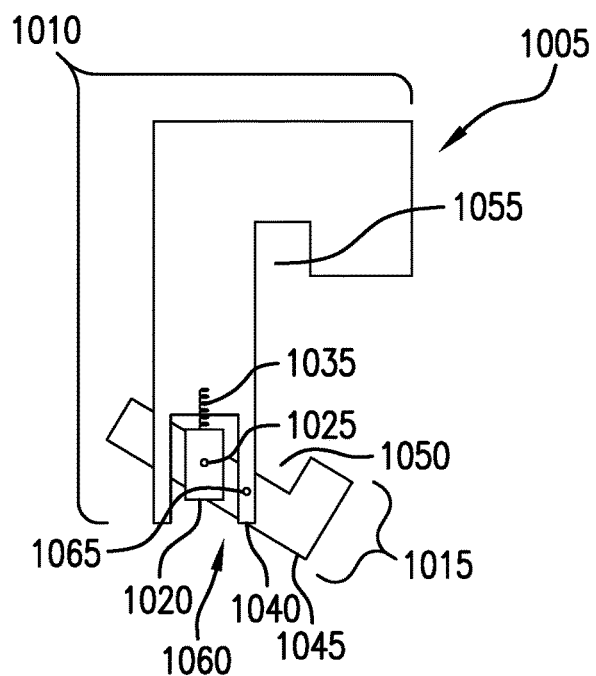
FIG. 10B depicts a side view of an exemplary pivotably releasable hinge fastening system with a compressed spring.

FIG. 10B depicts a side view of an exemplary pivotably releasable hinge fastening system with a compressed spring. A force 1045 applied to the release button 1020 causes the release button 1020 to travel towards the spring 1035 within the release channel 1030. The force 1045 compresses, via the release button 1020, the spring 1035 such that the pivot point 1025 travels within the release channel 1030. The bottom portion 1015, in response to the pivot point 1025 traveling within the release channel 1030, opens such that a lower lip 1050 moves away an upper lip 1055. In some embodiments, the pivotably releasable hinge fastening system 1005 may disengage from the DIN rail 905 when the spring 1035 is compressed. In some embodiments, a tool (e.g., screw driver) may be required to provide the force 1045.

Although various embodiments have been described with reference to the Figures, other embodiments are possible. For example, in the event that the safety controller is configurable, a connector port may be configured to receive a network communication link such that the configurable safety controller may be configured via an external device. In some embodiments, the external device may be a computer connected via a wired connection to the network communication link. In other embodiments, a wireless adapter may connect to the connector port to provide a wireless device (e.g., mobile electronic device such as a smartphone) access to the safety controller. The wireless device may configure, via the wireless adapter, the safety controller.

In some embodiments, the connector ports may be M12 connectors. In various embodiments, the connector ports may be M8 connectors. A combination of M12 connectors and M8 connectors may be disposed on the front cover of the quick-connector conversion system.

In some embodiments, the device communication module and the terminal communication module may include microprocessors and non-volatile memory modules. For example, if a quick-connector conversion system is retrofitted for use with a safety controller that does not have a capacity to operate light indicators on the quick-connector conversion system, the non-volatile memory modules may include instructions, that when executed by the microprocessors, operates the light indicators.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A quick-connector conversion system comprising:
   a removable front cover having connector apertures through which a plurality of connector ports outwardly extend through an exterior of the front cover, the front cover having a display aperture configured to receive a display face of a safety controller;
   a first communication module fixedly disposed in an interior of the front cover, the first communication module electrically connected to the plurality of connector ports; and,
   a rear module including a second communication module, the second communication module electrically connected to a plurality of I/O terminals of the safety controller,
   wherein, when the front cover aligns with the rear module, the display face of the safety controller is accessible via the display aperture, and the front cover releasably couples to a housing of the safety controller such that the first communication module pluggably connects to the second communication module facilitating electrical communication between the plurality of I/O terminals and the plurality of connector ports;
   wherein the plurality of connector ports are configured to receive pluggable connections from an external device; and
   wherein the first communication module and the second communication module comprise printed circuit boards.

2. The quick-connector conversion system of claim 1, further comprising the removable front cover comprises colored outlines around the periphery of the connector apertures, wherein each colored outline indicates a specific external device.

3. The quick-connector conversion system of claim 1, further comprising the first communication module comprises a female connector coupled to the first communication module, wherein the female connector electrically connects to the plurality of connector ports.

4. The quick-connector conversion system of claim 3, further comprising the second communication module comprises a male connector coupled to the second communication module, wherein the male connector electrically connects to the plurality of I/O terminals.

5. The quick-connector conversion system of claim 4, wherein when the female connector electrically couples to the male connector, the plurality of connector ports electrically connect to the plurality of I/O terminals.

6. The quick-connector conversion system of claim 1, further comprising the front cover and the rear module configured to retro-fit to currently available safety controllers.

7. The quick-connector conversion system of claim 1, further comprising the front cover comprises indicator lights around the periphery of the connector apertures, wherein each indicator light illuminates to indicate a status of each connector port of the plurality of connector ports.

8. The quick-connector conversion system of claim 7, wherein the indicator lights illuminate in flash patterns to indicate a fault between an external device and a connector port of the plurality of connector ports.

9. A quick-connector conversion system comprising:
   a removable front cover having connector apertures through which a plurality of connector ports outwardly extend through an exterior of the front cover;
   a first communication module fixedly disposed in an interior of the front cover, the first communication module electrically connected to the plurality of connector ports; and,
   a rear module including a second communication module, the second communication module electrically connected to a plurality of I/O terminals of a safety controller,
   wherein, when the front cover aligns with the rear module, the front cover releasably couples to a housing of the safety controller such that the first communication module pluggably connects to the second communication module facilitating electrical communication between the plurality of I/O terminals and the plurality of connector ports;
   wherein the plurality of connector ports are configured to receive pluggable connections from an external device; and
   wherein the first communication module and the second communication module comprise printed circuit boards.

10. The quick-connector conversion system of claim 9, further comprising the removable front cover comprises a display aperture configured to receive a display face of the safety controller.

11. The quick-connector conversion system of claim 9, wherein the pluggable connections include at least one member of a group consisting of M8 and M12 connectors.

12. The quick-connector conversion system of claim 9 further comprising the first communication module comprises a female connector coupled to the first communication module, wherein the female connector electrically connects to the plurality of connector ports.

13. The quick-connector conversion system of claim 12, further comprising the second communication module comprises a male connector coupled to the second communication module, wherein the male connector electrically connects to the plurality of I/O terminals, wherein when the female connector electrically couples to the male connector, the plurality of connector ports electrically connect to the plurality of I/O terminals.

14. A quick-connector conversion system comprising:
   a removable front cover having connector apertures through which a plurality of connector ports outwardly extend through an exterior of the front cover;
   a first communication module fixedly disposed in an interior of the front cover, the first communication module electrically connected to the plurality of connector ports; and,
   means for electrically connecting to a plurality of I/O terminals of a safety controller, wherein, when the front cover aligns with a rear module, the front cover releasably couples to a housing of the safety controller such that the first communication module pluggably connects to a second communication module facilitating electrical communication between the plurality of I/O terminals and the plurality of connector ports;

wherein the first communication module and the second communication module comprise printed circuit boards;

wherein the plurality of connector ports are configured to receive pluggable connections from an external device.

15. The quick-connector conversion system of claim 14, further comprising the removable front cover comprises a display aperture configured to receive a display face of the safety controller.

16. The quick-connector conversion system of claim 14, further comprising the means for electrically connecting to a plurality of I/O terminals comprises a printed circuit board.

\* \* \* \* \*